US012180761B1

(12) United States Patent
Calamia, III

(10) Patent No.: US 12,180,761 B1
(45) Date of Patent: Dec. 31, 2024

(54) GATE LATCH SYSTEM

(71) Applicant: Eric Francis Calamia, III, Reno, NV (US)

(72) Inventor: Eric Francis Calamia, III, Reno, NV (US)

( * ) Notice: Subject to any disclaimer, the term of this patent is extended or adjusted under 35 U.S.C. 154(b) by 0 days.

(21) Appl. No.: 18/386,002

(22) Filed: Nov. 1, 2023

Related U.S. Application Data

(60) Provisional application No. 63/421,494, filed on Nov. 1, 2022.

(51) Int. Cl.

| | |
|---|---|
| ***E05C 3/16*** | (2006.01) |
| ***E05B 53/00*** | (2006.01) |
| ***E05B 65/00*** | (2006.01) |
| ***E05B 79/20*** | (2014.01) |
| ***E05C 3/00*** | (2006.01) |
| ***E05C 9/20*** | (2006.01) |

(52) U.S. Cl.
CPC .............. *E05C 3/162* (2013.01); *E05C 3/006* (2013.01); *E05B 53/003* (2013.01); *E05B 65/0007* (2013.01); *E05B 79/20* (2013.01); *E05C 9/20* (2013.01); *Y10S 292/29* (2013.01)

(58) Field of Classification Search
CPC . E05C 3/162; E05C 3/006; E05C 9/20; E05C 9/22; E05C 9/24; E05B 65/007; E05B 53/003; E05B 79/20; E05B 11/021; E05B 65/0007; Y10T 292/1069; Y10T 292/1057; Y10T 292/57; Y10T 292/702; Y10T 292/083; Y10T 292/1047; Y10T 292/0855; Y10T 292/0931; Y10T 292/0841; Y10T 292/0899; Y10T 292/094; Y10T 292/0992; Y10T 292/1017; Y10T 74/20462; Y10T 74/2045; Y10T 74/20456; Y10S 292/29; Y10S 292/14
USPC .............................................. 74/502.5, 502.6
See application file for complete search history.

(56) References Cited

U.S. PATENT DOCUMENTS

| | | | | |
|---|---|---|---|---|
| 267,168 A * | 11/1882 | Dudley | E05B 85/247 | 292/30 |
| 2,986,409 A * | 5/1961 | Weber | H02G 3/0683 | 285/154.3 |
| 3,433,518 A * | 3/1969 | Foltz | E05C 3/24 | 292/238 |
| 3,498,156 A * | 3/1970 | McAllister | F16H 59/20 | 74/513 |

(Continued)

FOREIGN PATENT DOCUMENTS

| | | | | |
|---|---|---|---|---|
| DE | 10331712 A1 * | 1/2005 | E05B 79/20 | |
| DE | 102016001740 A1 * | 8/2016 | B60R 9/055 | |

*Primary Examiner* — Christine M Mills
*Assistant Examiner* — Faria F Ahmad
(74) *Attorney, Agent, or Firm* — Plager Schack LLP; Mark H. Plager, Esq.; Naomi Mann, Esq.

(57) ABSTRACT

Disclosed is a gate latch assembly comprising a gate latch cable including a pull loop on a first end of the cable, and a fitting on a second end of the cable, opposite the first end. In certain embodiments, the fitting is made from a zinc, zinc alloy, and/or aluminum which is die cast onto the second end of the cable and is configured to engage a gate latch and to maintain an alignment with a gate latch and/or pull loop such that a pull force on the cable is at an optimal alignment with the moment arm of the gate lock hook. In some embodiments, the end of the cable onto which the fitting material is die cast may be frayed.

14 Claims, 2 Drawing Sheets

(56) References Cited

U.S. PATENT DOCUMENTS 3,743,335 A * 7/1973 Reilhac .................. E05B 83/24 292/DIG. 43
4,103,950 A * 8/1978 Yunt .................. E05B 17/2003 292/225
4,456,289 A * 6/1984 Badiali .................. E05B 83/24 292/28
RE31,899 E * 5/1985 Mochida ................ E05B 79/20 292/336.3
4,929,007 A * 5/1990 Bartczak ................ E05B 79/20 292/216
4,936,611 A * 6/1990 Palvolgyi ............... E05B 83/16 292/216
5,078,438 A * 1/1992 Bieganski .......... E05B 17/2007 81/302
5,116,090 A * 5/1992 Nichandros .............. E05C 3/16 292/DIG. 60
5,358,292 A * 10/1994 Van Wiebe .............. E05C 3/30 292/225
5,655,801 A * 8/1997 Casey ................ E05B 65/0007 292/210
6,062,615 A * 5/2000 Hunt ...................... E05B 85/12 292/216
6,170,892 B1 * 1/2001 Lantiegne .......... E05B 65/0007 292/237
6,394,511 B1 * 5/2002 Lam ....................... E05B 83/16 292/DIG. 43
6,523,869 B1 * 2/2003 Jensen ................... E05B 83/16 292/216
6,705,178 B1 * 3/2004 Grandjean ............... F16C 1/14 292/DIG. 31
8,636,308 B2 * 1/2014 Calamia, III ............ E05C 3/24 292/225
8,764,076 B2 * 7/2014 Glover ..................... E05C 3/30 292/225
10,151,124 B2 * 12/2018 Faitl ........................ E05B 81/20
10,358,849 B2 * 7/2019 Glover .................... E05B 17/10
11,459,806 B1 * 10/2022 Bishop .................... E05C 17/04
2002/0083746 A1 * 7/2002 Cleveland .......... G07C 9/00182 70/233
2002/0101082 A1 * 8/2002 Schwaiger ............. E05B 83/16 292/216
2011/0254289 A1 * 10/2011 Calamia, III ............ E05C 3/24 292/336.3
2013/0341939 A1 * 12/2013 Glover ..................... E05C 3/16 292/341.17
2014/0004757 A1 * 1/2014 Matsushita ............ H01R 4/184 439/877
2014/0333076 A1 * 11/2014 Graute .................... E05B 79/02 292/336.3
2014/0339835 A1 * 11/2014 Wepf ................. E05B 65/0007 292/196
2016/0168884 A1 * 6/2016 Hillgaertner .......... E05B 83/247 292/196
2017/0122004 A1 * 5/2017 Calamia, III ....... E05B 65/0007
2018/0058116 A1 * 3/2018 Erices ..................... E05B 83/18
2018/0112442 A1 * 4/2018 Enomoto .............. E05B 77/265
2018/0238084 A1 * 8/2018 Weber ................... E05B 53/003
2019/0169884 A1 * 6/2019 Byun ...................... E05B 79/22
2022/0275670 A1 * 9/2022 Guevara Arreola .. E05B 77/265
2022/0349217 A1 * 11/2022 Xu .......................... E05B 81/05

* cited by examiner

GATE LATCH SYSTEM

RELATED APPLICATION

This application claims benefit to U.S. Application No. 63/421,494 filed Nov. 1, 2022, which is incorporated by reference herein in its entirety.

BACKGROUND

The present disclosure relates generally to gate latch systems and assemblies.

Conventional gate latch cables may not be strong enough to pull a misaligned, stuck or frozen gate latch open. As such, an improved gate latch system is desirable.

SUMMARY

According to various embodiments, disclosed is a gate latch assembly comprising a gate latch cable including a pull loop on a first end of the cable, and a fitting on a second end of the cable, opposite the first end. In certain embodiments, the fitting is made from a zinc, zinc alloy, or aluminum material ("fitting material") which is die cast onto the second end of the cable and is configured to engage a gate latch and to maintain an alignment with a gate latch and/or pull loop such that a pull force on the cable is at an optimal alignment with the moment arm of the gate lock hook. In some embodiments, the end of the cable onto which the fitting material is die cast may be frayed.

According to various embodiments, disclosed is a gate latch system, comprising a fitting configured to engage through a hole within a lock hook of the gate latch system for enabling the lock hook to be pulled to an opened position via a pull force on a cable coupled to the fitting, wherein the fitting includes a slot configured to capture a segment of the lock hook adjacent to the hole, wherein the fitting is configured to engage the lock hook in a manner which orients the alignment of fitting in a restricted direction in relation to the lock hook, and further restricts movement of the fitting with respect to the lock hook.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
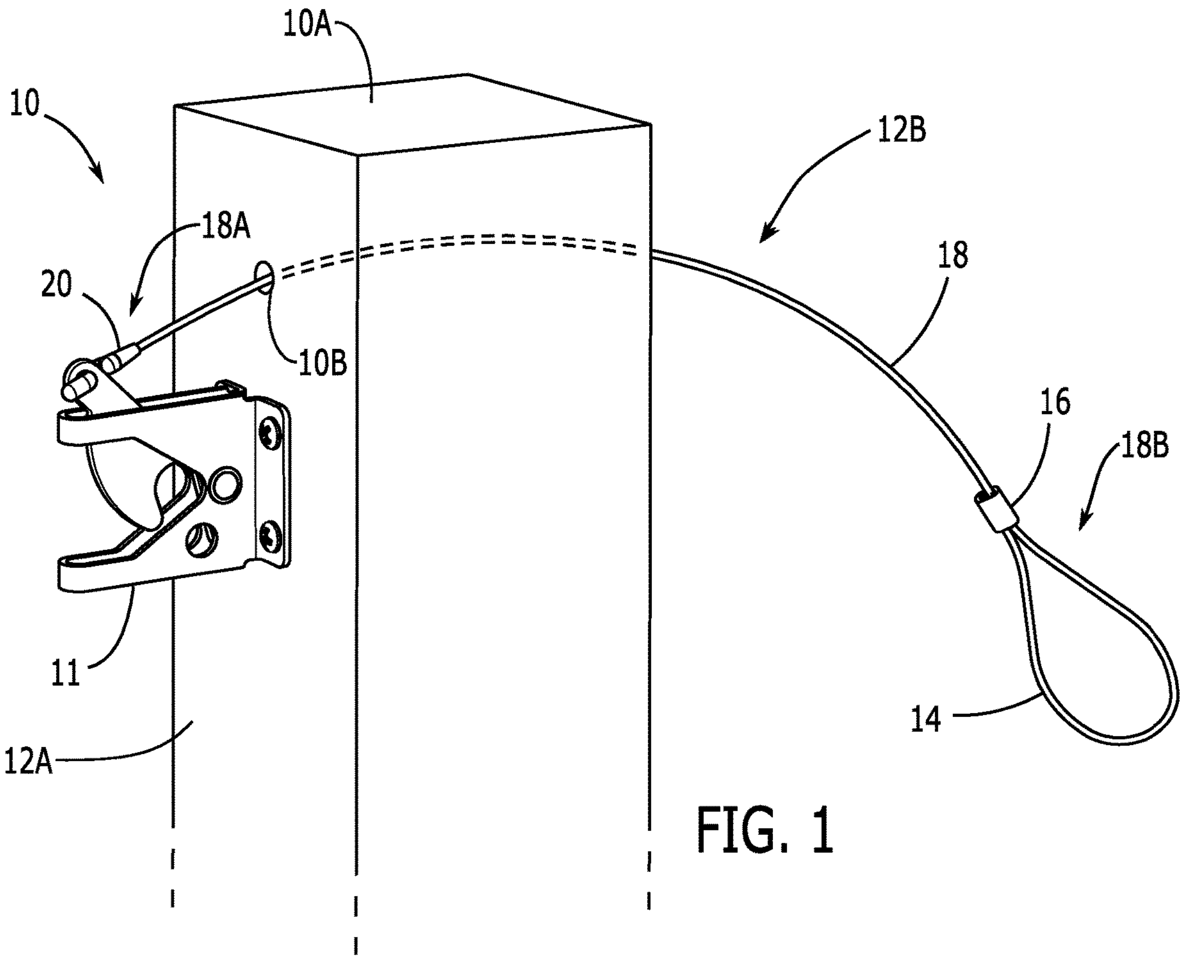
FIG. 1 is a front perspective view of a gate latch assembly comprising a cable with pull loop and die cast fitting.
Figure 2:
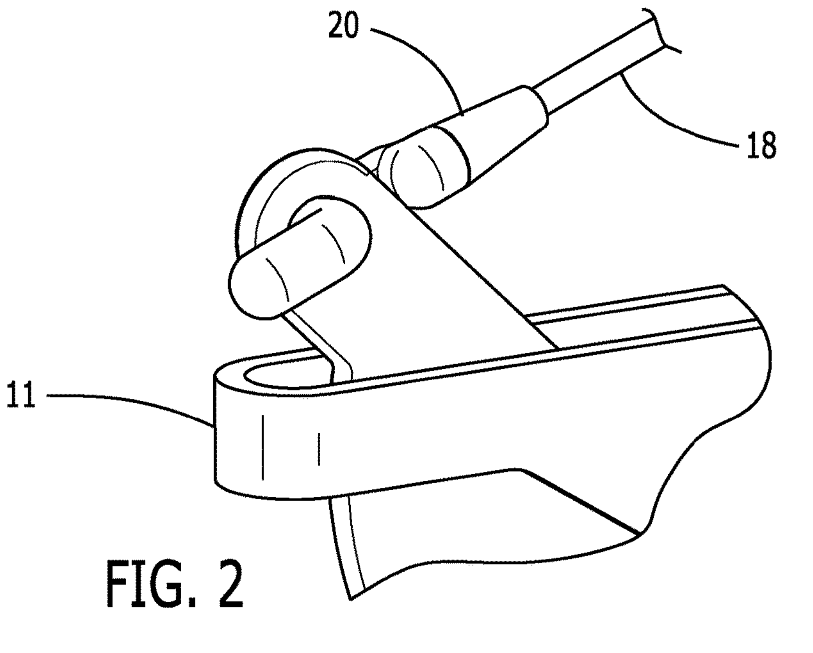
FIG. 2 is a detailed perspective view of the gate latch.

Conventional gate latch cables may not be strong enough to pull a misaligned, stuck and/or frozen gate latch open. Certain gate latch cables may connect to the latch with a clip that spreads open and fails when pulled or the clip may slide off the end of the cable. The disclosed subject matter provides an improved gate latch assembly which includes a gate latch cable with a pull loop on one end and a die cast fitting ("fitting") on the other end. In certain embodiments, the die cast or fitting material may comprise zinc, zinc alloy, or aluminum. In certain embodiments, the fitting material may be cast onto the end of a frayed, multi-strand cable, enabling a much stronger pull force without failing. In further embodiments, the fitting may be configured to maintain a certain alignment with the gate latch and/or pull loop such that a pull force on the cable is at an optimal alignment with the moment arm of the gate lock hook. As such, the latch may be easily pulled open without complications.

According to various embodiments as depicted in FIGS. 1-4, gate latch assembly 10 may generally comprise a gate latch cable 18 including a fitting 20 at a first cable side 18A. Gate latch cable 18 may extend through gate post 10A from a first side 12A to a second side 12B of gate post 10A, wherein fitting 20 is configured to engage a latch 11 mounted on first side 12A. In further embodiments, gate latch cable 18 may pass through a hole 10B between first side 12A and second side 12B, as shown.

Latch 11 may generally include a lock hook 11A (also referred to as "latch hook") rotatably coupled to a latch retainer 11B. In certain embodiments, lock hook 11A includes a generally planar body including a hole 11C through which fitting 20 may be engaged. As is known in the art, lock hook 11A may lockably engage a bar or rod of a gate/fence (not shown) to keep the gate locked. Lock hook 11A may further be moved to an open position by pulling cable 18 away from gate post 10A to enable the rod of the gate to release whereby the gate may be opened. It shall be appreciated that various design configurations and components may be employed in alternate embodiments.

In certain embodiments, cable 18 may be resistant to twist. In some embodiments, cable 18 may be a multi-strand cable. Fitting 20 is bonded to a first side end 22 of cable 18 in a manner which maintains its orientation with respect to the pull loop. In one embodiment, fitting 20 is die cast onto first side end 22 of gate latch cable 18. Fitting 20 may further be configured to engage lock hook 11A through hole 11C in a manner which roughly sets or orients the alignment of fitting 20 in a restricted and/or fixed direction in relation to lock hook 11A. In further embodiments, fitting 20 is configured to substantially constrain or restrict movement of fitting 20 with respect to lock hook 11A when fitting 20 is engaged through hole 11C.

Figure 3:
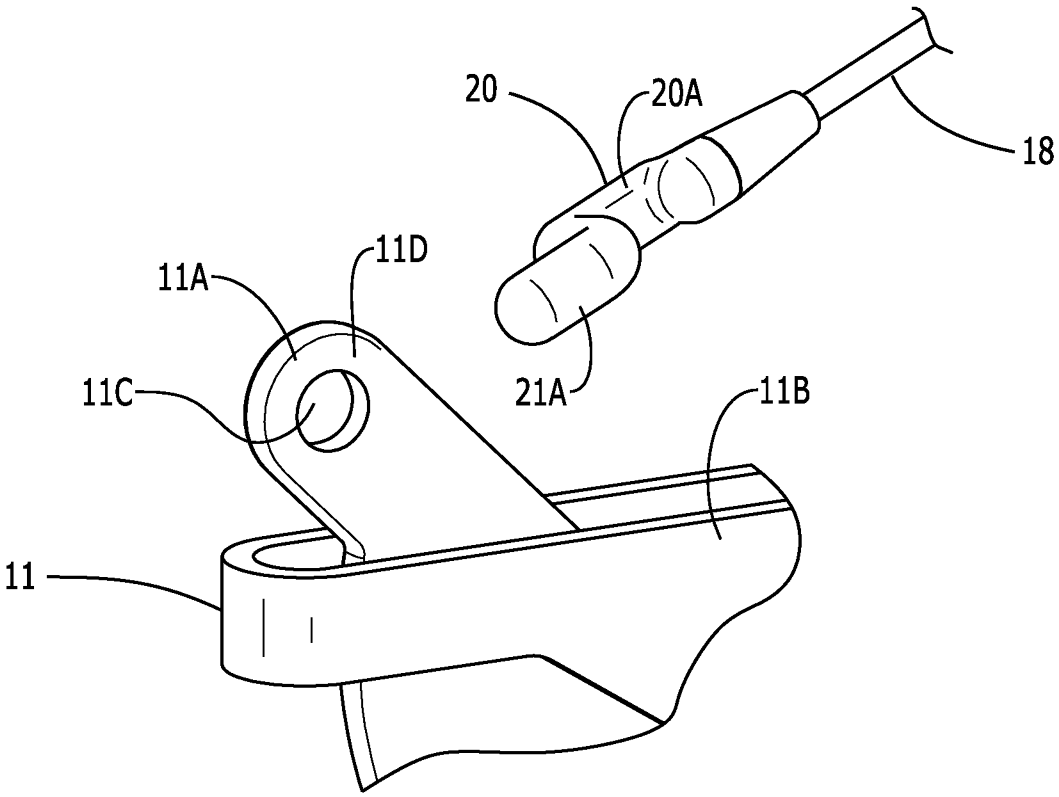
FIG. 3 is an exploded detail perspective view of the gate latch.
Figure 4:
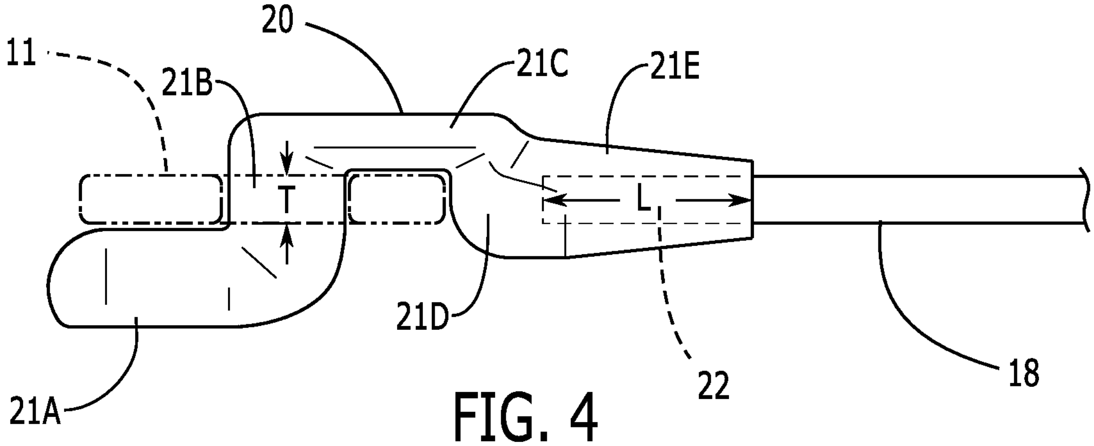
FIG. 4 is a top plan view of the gate latch.

In one embodiment, and as best depicted in FIGS. 3 and 4, fitting 20 may incorporate a zigzagging end shape, including a first segment 21A extending in a first linear direction, a second segment 21B extending from first segment 21A in a second linear direction that intersects the first linear direction, a third segment 21C extending from second segment 21B in a third linear direction that is away from the first segment and intersects the second linear direction, a fourth segment 21D extending from third segment 21C in a fourth linear direction that is towards the first segment and intersects the third linear direction, and a fifth segment 21E extending from forth segment 21D in a fifth linear direction that is away from the first segment 21A and intersects the forth linear direction, as shown. In embodiments, the first segment 21A and third segment 21C may be substantially parallel. In further embodiments, fifth segment 21E may be substantially parallel to first and/or third segment. Second segment 21B may extend at an angle of between about 45 degrees and about 90 degrees from the first segment 21A, or between about 80 degrees and about 90 degrees, or at about 90 degrees. In certain embodiments, first side end 22 of gate latch cable 18 is die cast onto segment 21E of the fitting.

Segments 21A and 21B are configured to pass through hole 11C. In certain embodiments, segment 21B has a diameter slightly smaller than that of hole 11C, such that segment 21B fits snuggly within hole 11C. This restricts lateral movement of fitting 20 with respect to lock hook 11A. In further embodiments, segment 21B has a thickness "t" slightly larger than that of lock hook 11A. This causes vertical movement of fitting 20 with respect to lock hook 11A to be restricted via segments 21A and 21C. Additionally, segments 21B, 21C, and 21D, create a slot 20A configured to capture an inner side segment 11D of lock hook 11A, said inner side segment 11D being adjacent to hole 11C. Thus, the shape and sizing of fitting 20 enables the fitting to maintain a fixed alignment with respect to the lock hook 11A, and with restricted movement. This prevents fitting 20 from twisting and weakening the bond between fitting 20 and lock hook 11A. This further keeps cable 18 aligned perpendicular to the axis of rotation of the lock hook so that a pull force may be applied in the most efficient direction (i.e., along the centerline of the lock hook) to move lock hook 11A to the open position. According to an exemplary embodiment, fitting may be sized to pass through a hole of about 0.278 in diameter. In some embodiments, segments 21A and 21E may be about 0.11 inches in diameter. Additionally, fitting may be approximately 0.95 inches in length, with slot 20E being about 0.142 inches. It shall be appreciated however, that different sizes and dimensions may be used in alternate embodiments.

In some embodiments, a pull loop 14 may be provided at a second cable end 18B opposite first end 18A, but may be omitted in alternate embodiments. In certain embodiments, pull loop 14 has a restricted orientation with respect to gate latch cable 18; that is, pull loop 14 tends to naturally face or orient in a specific direction with respect to cable 18 absent a twist force. In one embodiment, pull loop 14 may include a loop sleeve 16 at its base, that provides added stiffness/twist resistance, but not necessarily so. In certain embodiments, pull loop 14 may be formed via overlapping and adjoining the tip end of latch cable 18 and an intermediate section of the cable, as shown. In alternate embodiments, loop sleeve 16 may be a separate piece which is attached to the cable. In certain embodiments as depicted in the figures, the long planar face of fitting 20 is in perpendicular alignment to the long planar face of pull loop 14. This restricts cable twist when a user pulls gate latch cable 18 by gripping pull loop 14, and further directs a centerline pull force for maximized leverage.

According to an exemplary embodiment, cable 18 may be a stainless steel, 7×7 strand aircraft cable with a diameter of approximately 1/16 inches, and a length of approximately 10 inches. Second cable end 18B may be formed into pull loop 14, which may be approximately 2 inches long and is held in form by loop sleeve 16 that may be crimped onto the cable. In some embodiments, loop sleeve 14 may be a zinc plated copper loop sleeve. It shall be appreciated that various other types of cables and loop sleeve components, which may be of various sizes, may be used in alternate embodiments.

In certain embodiments, fitting 20 may be a zinc, zinc alloy, or aluminum fitting and may be formed by die casting the fitting material onto the multi-stranded end 22 of cable 18 using a die with the requisite shape and into which molten fitting material is injected. Cable 18 is inserted into the molten fitting material within the die and the fitting material is allowed to cool. In embodiments, the die is designed to align the cable with the center of the fitting. Once cooled the die is pulled open and the cable is released and completed. In some embodiments, the length "L" of the cable end within fitting 20 may be approximately 0.1 inches to about 0.5 inches, or about 0.2 inches to about 0.4 inches, or about 0.3 inches, or about 0.3125 inches. In certain embodiments, the end of the cable may be slightly frayed to provide more mechanical strength and bond with the fitting material of the fitting. In further embodiments, the cable may be inserted at an orientation which aligns the planar face of pull loop 14 orthogonal to the planer face of fitting 20. Thus, the disclosed gate latch assembly 10 provides a connection between fitting 20 and cable 18 which is stronger than conventional connection methods. In embodiments, gate latch assembly 10 may be used to pull latch 11 open from the opposite side of the gate and/or fence by pulling on cable 18 and/or pull loop 14 extending to said opposite side. Fitting 20 connects to the gate latch hook and the pull loop is pulled to pull the latch hook back and open the gate latch and release the gate to open.

It shall be appreciated that gate latch assembly 10 can have multiple configurations in different embodiments. In certain embodiments, the disclosed assembly may be applied to other types of latches or hardware. It shall be appreciated that the components of gate latch assembly 10 described in several embodiments herein may comprise any alternative known materials in the field and be of any size and/or dimensions.

It shall be appreciated that the components of gate latch assembly 10 described herein may be manufactured and assembled using any known techniques in the field. Furthermore, the components of gate latch assembly 10 may be provided as an assembled and/or integral unit or may be provided as a kit/assembly of parts according to alternate embodiments.

It shall be understood that the orientation or positional relationship indicated by terms such as "upper", "lower", "front", "rear", "left", "right", "top", "bottom", "inside", "outside," "vertical," etc., is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' 'substantially,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A gate latch system, comprising:

a fitting configured to engage through a hole within a lock hook of the gate latch system for enabling the lock hook to be pulled to an opened position via a pull force on a cable coupled to the fitting, wherein the fitting includes an open slot configured to securely capture an inner side segment of the lock hook adjacent to the hole, the slot comprising a bottom segment and side segments extending generally upwards from opposite sides of the bottom segment, said inner side segment of the lock hook being planar and positioned flatly against the bottom segment and between the side segments of the fitting when captured within the open slot, wherein the fitting is configured to engage the lock hook in a manner which orients an alignment of the fitting in a restricted direction in relation to the lock hook, and further restricts movement of the fitting with respect to the lock hook.

2. The gate latch system of claim 1, wherein the fitting comprises a generally zigzagging shape, and further includes:

first and second end segments each extending linearly from a respective one of the side segments on an end of the side segment opposite the bottom segment and in a direction away from the slot, the first and second end segments extending in a direction parallel to the bottom segment.

3. The gate latch system of claim 2, further comprising said cable, wherein a first end of the cable is embedded within the second end segment.

4. The gate latch system of claim 3, wherein the fitting is made of a fitting material comprising zinc, zinc alloy, and/or aluminum, and wherein the cable is embedded into the fitting material via a casting process used to produce the fitting.

5. The gate latch system of claim 1, wherein a surface of the bottom segment within the slot is flat.

6. The gate latch system of claim 1, further comprising said cable, wherein the fitting is coupled to a first side of the cable in a manner which maintains a fixed orientation of the fitting with respect to the cable.

7. The gate latch system of claim 6, wherein the cable is embedded within a portion of the fitting via a casting process used to produce the fitting.

8. The gate latch system of claim 7, wherein the fitting is made of a zinc, zinc alloy, and/or aluminum material.

9. The gate latch system of claim 7, wherein the cable is a multi-strand cable.

10. The gate latch system of claim 6, wherein the cable includes a pull loop at a second end opposite the first end, the pull loop having a restricted orientation with respect to the cable.

11. The gate latch system of claim 10, wherein the pull loop includes a loop sleeve at its base.

12. The gate latch system of claim 1, wherein the fitting is configured to orient the pull force on the cable in direct alignment with a centerline of the lock hook.

13. The gate latch system of claim 1, wherein the fitting is made of a zinc, zinc alloy, and/or aluminum material.

14. The gate latch system of claim 1, wherein the fitting has a rounded end opposite a cable attachment end.

* * * * *